Dec. 18, 1956  A. A. HEYMAN  2,774,315
AUTOMATIC CONE MAKING MACHINE WITH STATIONARY ROLLER UNIT
Filed July 14, 1952  4 Sheets-Sheet 2
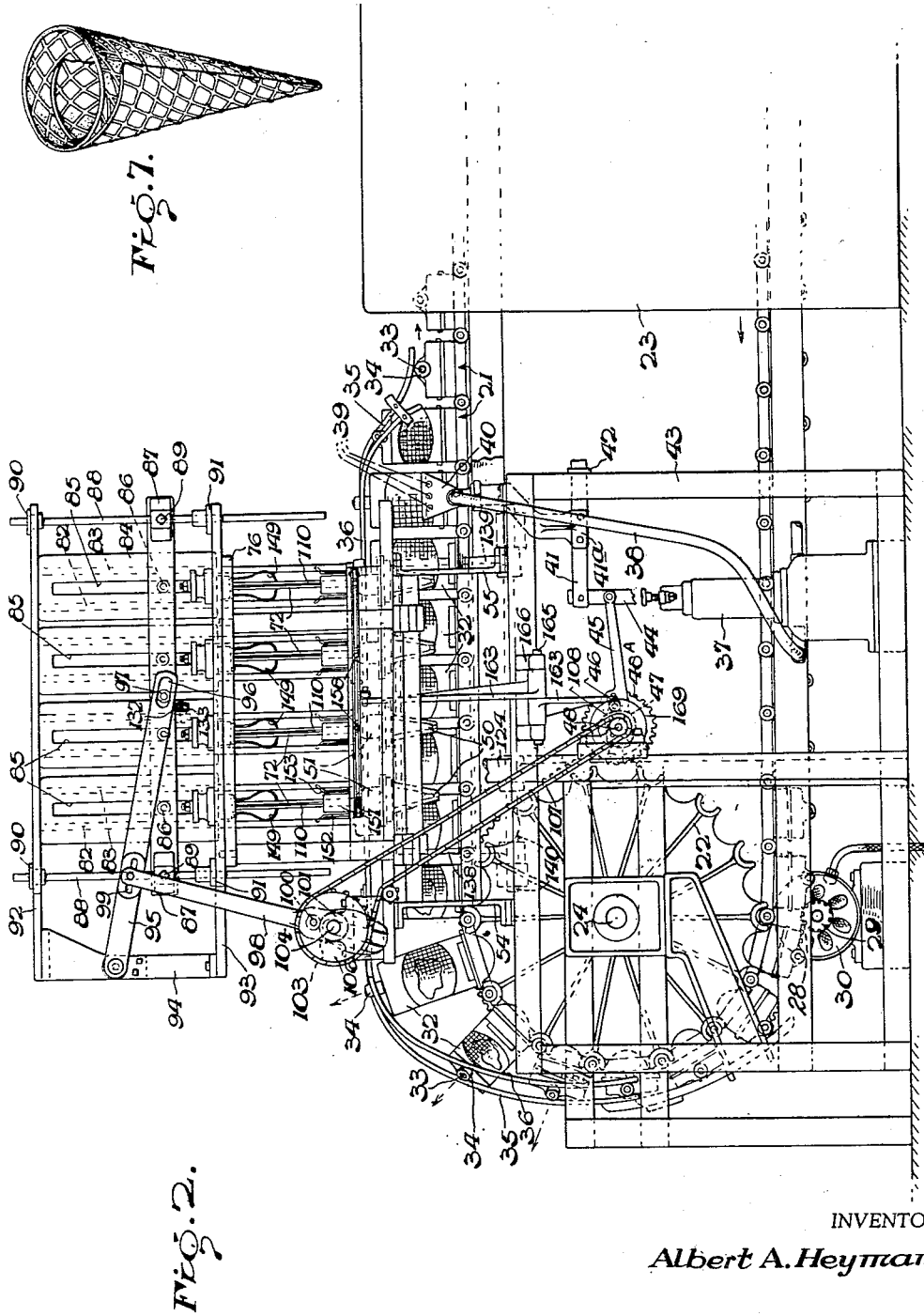
INVENTOR
Albert A. Heyman
BY Albert J. Kramer
ATTORNEY

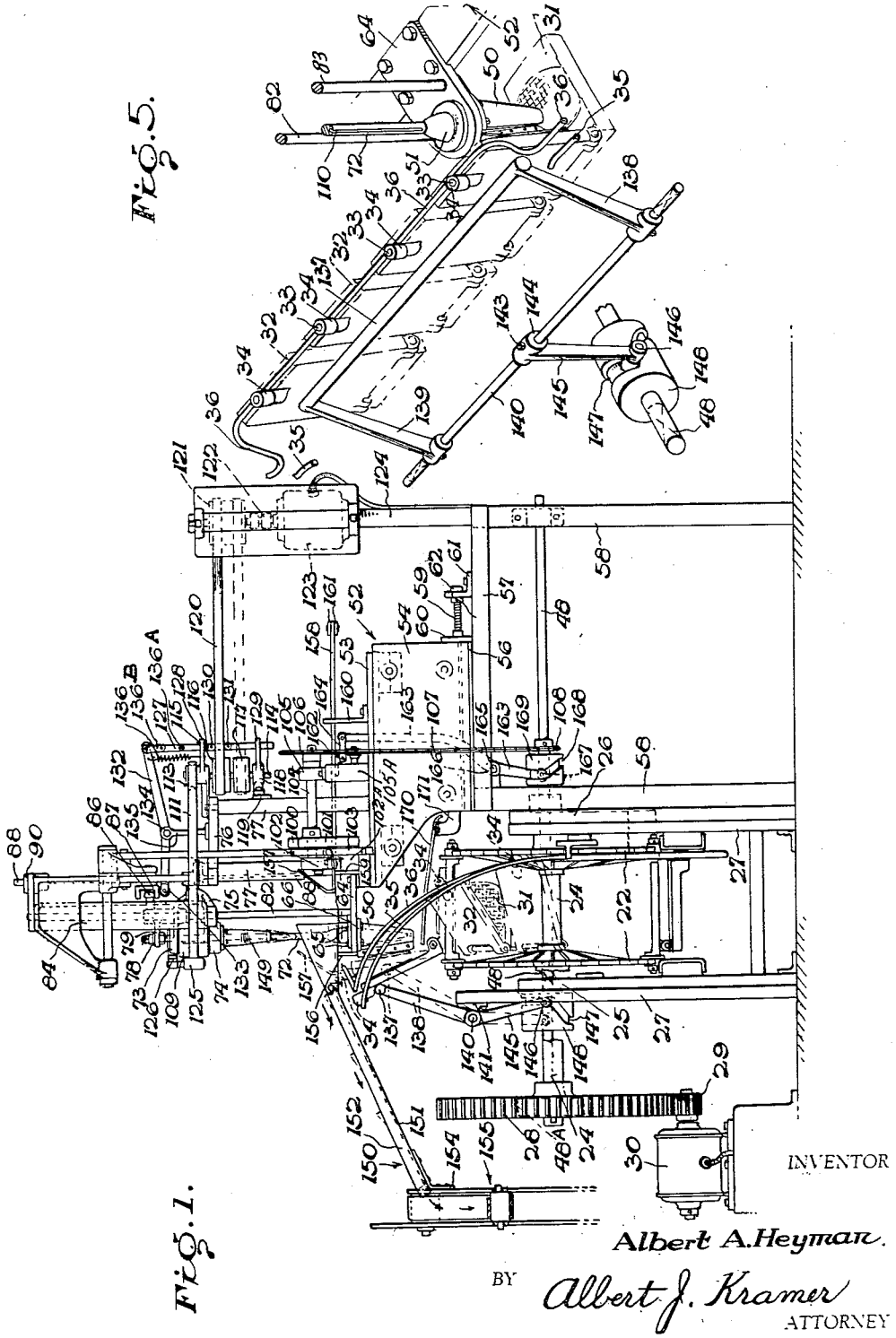

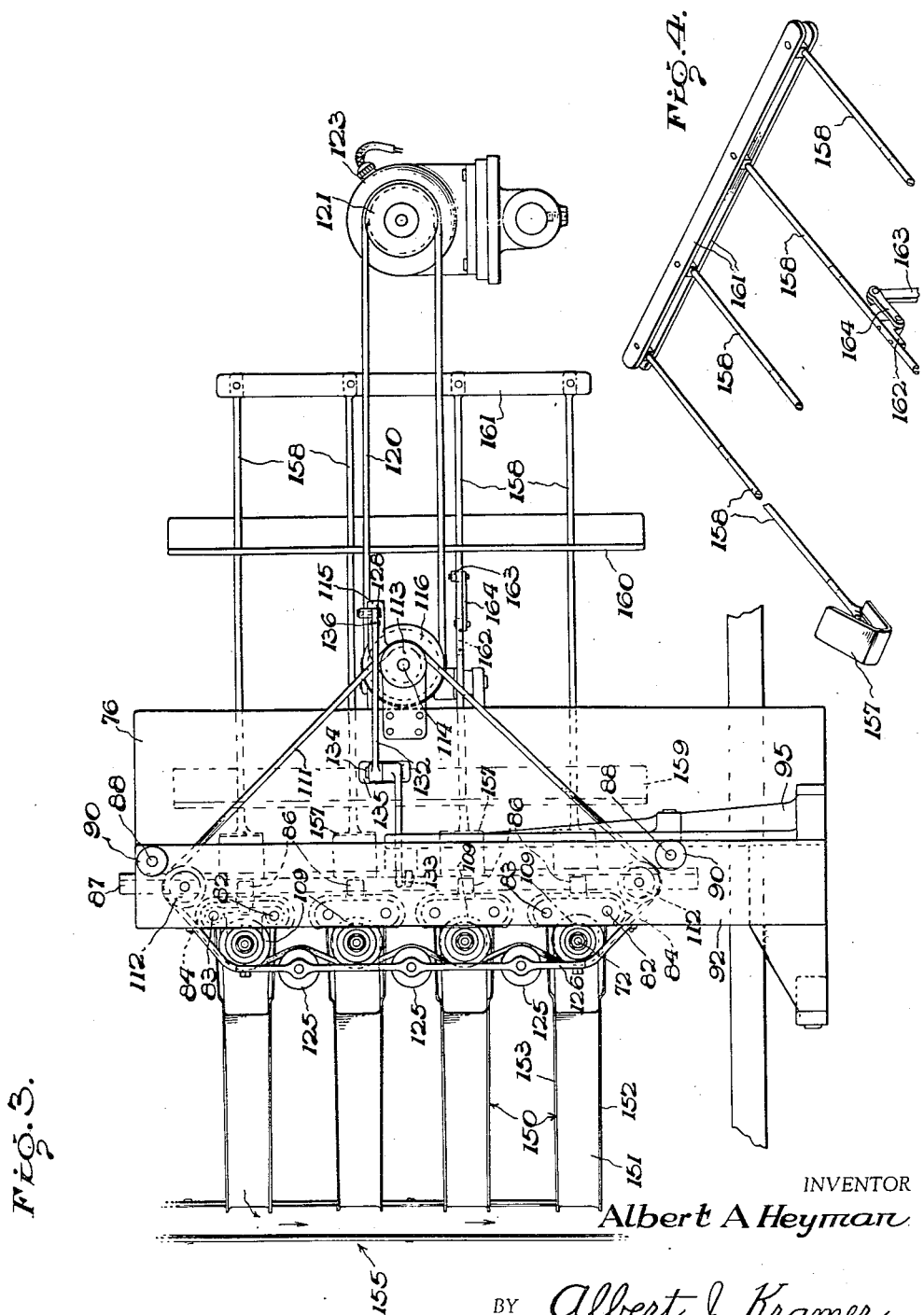

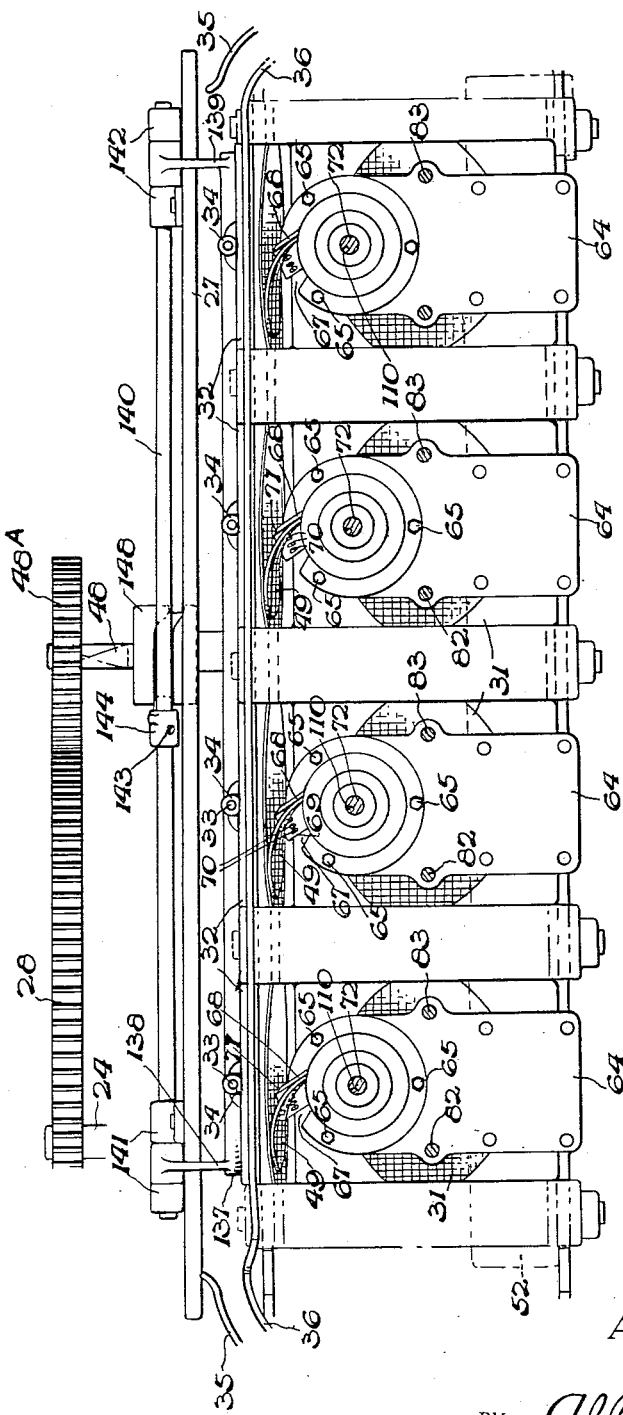

United States Patent Office 2,774,315
Patented Dec. 18, 1956

2,774,315

AUTOMATIC CONE MAKING MACHINE WITH STATIONARY ROLLER UNIT

Albert A. Heyman, Baltimore, Md., assignor to The Maryland Baking Company, Baltimore, Md., a corporation of Maryland Application July 14, 1952, Serial No. 298,875

8 Claims. (Cl. 107—4)

This invention relates to machines for automatically manufacturing ice cream cones of the type commonly referred to as rolled or sugar cones and used as an edible receptacle for various frozen confectionery products.

Ice cream cones of the type mentioned are customarily formed by baking batter having a high sugar content in the form of a flat wafer and then rolling it into a conical shape while hot and pliable, thereafter permitting it to cool and harden.

Cones of this type are presently manufactured by two general types of machines, one comprising a baking unit to bake the wafer and a rolling unit to form the cone, the transference from the baking unit to the rolling unit being by hand operation; and the other type involving an automatic transference of the wafers from the baking unit to the rolling unit. The present invention relates to the automatic type of machine.

The rolling unit of previous automatic types of machines comprises a rotating turret in cooperative relation to the baking unit. The turret contains numerous rolling elements brought into proper relation sequentially with the baking unit by rotation of the turret. One of the principal objects of this invention is the provision of an automatic cone making machine of the type mentioned which completely avoids the need for such a rotating turret together with the many operational difficulties resulting therefrom and, at the same time, reducing sharply the number of rolling elements necessary for any given production capacity.

Another object of the invention is the provision of an automatic machine of the type mentioned, which occupies less space, requires fewer parts, is easier and inexpensive to operate and maintain in proper working condition.

A further object is the provision of such a machine comprising a baking unit and a rolling unit which are in fixed relation to each other, except for adjusting movements, the rolling unit having a bank of aligned rolling elements with slotted inlets for simultaneously receiving a group of wafers from the baking unit and means for correctly positioning the wafer carrying elements of the baking units to effect a transfer of wafers thereon into the said slots.

These and other objects and advantages of this invention will be apparent from the following description, considered together with the accompanying drawings.

In the drawings:

Fig. 1 is a side elevational view of an embodiment of the invention, partly broken away.

Fig. 2 is a front elevational view of the same embodiment.

Fig. 3 is a plan view of certain cooperative elements.

Fig. 4 is a perspective view of the reciprocating unit, partly broken away, associated with the discharge chutes.

Fig. 5 is a perspective view of a portion of the machine in position for transference of the wafers from the baking unit to the rolling unit.

Fig. 6 is a cross sectional view along the line 6—6 of Fig. 1.

Fig. 7 is a perspective view of the type of cone manufactured by the machine embodying the invention.

Referring with more particularity to the drawings in which like numerals designate like parts, the embodiment illustrated comprises an ordinary baking unit having an endless chain of waffle irons 21 linked together. The chain is carried by two pairs of vertical star or spider wheels, one pair of wheels 22 being on the exterior and the other pair of wheels (not shown) being in the interior of an oven 23 through which the waffle irons, with deposited batter, travel to bake the batter into individual wafers. The star wheels 22 are fixed on an axle 24 supported in bearings 25 and 26 on suitable frame members 27. The axle extends to the rear of the machine and a bull gear 28 is secured thereto. The bull gear meshes with a pinion 29 on the take-off shaft of a source of power, such as the electric motor 30.

The waffle irons 21 each comprise an inner or base plate or grill 31 and an outer or cover plate or grill 32 hinged to one side of the base grill. The outer side of the cover grill has a projecting stub shaft 33 which carries a cam roller 34 for use in hingedly moving the cover grill to the open and closed positions. This is effected by means of a guideway formed by a pair of parallel tracks or rails 35 and 36 between which the cam rollers slide. The guideway is shaped so that as the waffle irons leave the oven 23 at the bottom, they are gradually opened as they travel around the star wheels 22, being in the fully opened position at the top of the wheels.

The batter to be baked is free flowing and it is fed from a reservoir (not shown) by a batter pump 37 to a delivery pipe 38 which is connected to a group of discharge nozzles or nipples 39. These nozzles are carried on a reservoir 40 attached to a horizontal reciprocating arm 41 by a member 41A. One end of the arm 41 is slidably carried in a stationary sleeve 42 of a vertical frame member 43, the other end being pivotally connected to an inverted pendulum 44, the lower end being pivoted to a stationary member, such as the floor or the housing of the pump 37. Oscillation of the inverted pendulum is effected by means of an arm 45 pivoted thereto at one end and carrying at the other end a cam follower or roller 46 which is engaged with an eccentric cam 47 on a transverse shaft 48 which is geared to the bull gear 28 by a gear 48A, the gearing ratio being 4 to 1 for the embodiment illustrated (16 molds and 4 spinners). The arm 45 is supported on the shaft 48 by means of a longitudinal slot in the arm through which the shaft passes. The pendulum 44 is returned to a vertical position after displacement by cam 47 for operation of pump 37 by a spring (not shown) between the said pendulum 44 and a stationary frame member, such as the member 58.

The flow of batter and the oscillation of the nozzles relative to the waffle irons are so adjusted that the proper amount of batter is deposited on each waffle iron in a pattern which, when baked, will result in a wafer 49 that can be rolled into a cone of the type shown in Fig. 7.

Above the waffle irons there is mounted a group of cone rolling elements (4 illustrated in the drawings) each comprising a hollow mold 50 in the form of an inverted conical shell and a rotatable spinner core 51 adapted to coact with the mold to form the cone. These elements are carried by a carriage 52 comprising a horizontal plate 53 carried by legs, such as the transverse channel members 54, and 55. These channel members are, in turn, carried on shims 56 between the bottom thereof and a platform 57 at the top of floor legs 58. The carriage is transversely adjustable on the platform 57 by means of an adjusting screw 59 having one end threadedly engaging a nut 60 secured to the carriage. A bracket 61 secured to the platform 57 is disposed between the head 62 at the other end of the screw and a holding nut 63 for tightening against the bracket to maintain the screw in adjusted positions.

The molds 50 are carried on brackets 64 projecting rearwardly from the front end of the carriage and are secured thereto by bolts 65 passing through flanges 66 of the molds. Each mold is provided with a longitudinal slot opening 67 to permit entrance therein of the wafer to be formed. The slot extends from the apex of the cone to the top and is provided with an extension 68 constituting a scraper blade carrier, on the side of the slot facing opposite to the direction of travel of the upper reach of the chain of waffle irons. The extension 68 is rabbeted to receive flush a scraper blade 69 which is attached thereto by means of countersunk screws 70. The blade is beveled along its outer edge 71.

The spinner cores 51 are each mounted in axial alignment vertically above a corresponding mold 50. They are each secured to the lower end of a vertical reciprocating shaft 72. The upper part of the shaft 72 passes through a pair of vertically spaced arms 73 and 74 of a bracket 75, which bracket is secured to an upper plate 76 carried at the top of supporting columns 77 projecting upward from the carriage 52.

The upper end of the shaft 72 is journaled in a bearing 78 carried at one end of a bifurcated reciprocating arm 79. The other ends of the arm 79 are slidably engaged with vertical guide rods 82 and 83, respectively. The rods 82 and 83 pass downwardly through the bracket 75 and are secured to the lower mold bracket 64. The upper ends of the guide rods 82 and 83 are held in apertures at the upper ends of vertically elongated brackets 84 which are secured to or integral with the bracket 75. The rear side of the brackets 84 is open and the front sides are provided with vertical guide slots 85 through which horizontal fingers 86, integral with the arms 79, extend. The fingers 86 of all the units are held in a reciprocating horizontal channel 87, the width of the channel being greater than the thickness of the fingers 86 to provide for lost motion explained more fully hereinafter. The channel 87 is carried at its ends by a pair of vertical rods 88 to which it is secured by set screws 89 or any other suitable means. The rods 88 are slidably disposed in upper sleeves 90 and lower sleeves 91 of horizontal members 92 and 93, respectively. The frame member 92 lies on top of the brackets 84 and is secured to each bracket by bolts, welding, or any other suitable means, thereby serving also to hold the upper ends of the said brackets in fixed spaced relation. The lower frame member 93 is secured to the upper plate 76. A vertical strut 94 bridges and is connected to the frame members 92 and 93 at one end thereof and pivotally carries one end of an arm 95. The other end of said arm has a longitudinal slot 96 which slidably engages a roller 97 on the channel 87. Between the ends of arm 95, one end of a link 98 is adjustably pin-connected in a longitudinal slot 99. The other end of link 98 carries a cam follower 100 which engages an eccentric cam 101 on a jack shaft 104. The link 98 has an extension 103 beyond the cam follower 100 which is bifurcated to straddle the shaft 104 so as to hold it in position laterally. The shaft 104 is mounted in pillow block bearings 102 and 105 on the carriage 52 and it is driven by a sprocket 106 thereon geared by a sprocket chain 107 to a sprocket 108 on the transverse shaft 48. The pillow block bearing 102 is bolted to a vertical support 102A connected to and projecting upwardly from the plate 53 and is similar to the vertical support 105A for the pillow block 105.

Rotation of the spinner cores 51 is effected by means of rollers 109. Each roller 109 is slidably keyed to a corresponding spinner shaft 72 and is held between the arms 73 and 74 of the bracket 75. The keyway 110 is longitudinally grooved in the shafts and the key itself is secured to the rollers and slides in the groove as the shaft reciprocates, whereby the shaft may be rotated by the rollers and also reciprocated relative thereto.

The rollers are rotated by an endless belt 111 which passes around the rear side of the rollers 109, end idlers 112 and a drive pulley 113 at the upper end of a vertical jack shaft 114. The latter shaft is rotatably mounted at its upper end in a bearing 115 supported by the upper horizontal plate 76. The shaft 114 passes through the bearing and is connected to another pulley 116. The lower end of the shaft rotatably carries an idler pulley 117 directly below the pulley 116 and of the same diameter. Below the idler pulley 117, the bottom of the shaft is held in a bearing 118 carried on a bracket 119 attached to the supporting column 77.

Power is transmitted to the pulley 113 through the pulley 116, both of which are secured to the shaft 114, by a belt 120 passing around the pulley 116 and a wide vertical pulley 121 connected to a source of power, such as the take-off shaft 122 of an electric motor 123. The motor is shown mounted on a vertical frame member 124. The pulley 121 is at least as wide as the overall width of the two pulleys 118 and 119 and in horizontal alignment therewith. When the belt 120 is in its upper position as shown by the full lines in Fig. 1, the pulleys 116 and 121 are geared together and power is delivered by the motor through these pulleys to the pulley 113 and through belt 111 to the rollers 109. The frictional contact area between the belt 111 and rollers 109 is increased for practical purposes, by idlers 125 set inwardly between consecutive rollers and journaled in a horizontal bar 126 attached to each arm 73.

When the belt 120 is in its lower position as shown by the dotted lines in Fig. 1, it engages the pulley 117 to the exclusion of pulley 116 and no power is delivered to the pulley 113, because, the pulley 116 is rotatable on the shaft 114. The belt 120 is moved between the upper and lower positions by means of a vertical reciprocating bar 127, acting as a transmission operator, slidably mounted in guide sleeves 128 and 129 projecting forwardly from the bearings 115 and 118. Anti-friction rollers 130 and 131 attached to the bar 127 straddle the belt 120 and the upper end of the bar is connected to one end of a lever 132 by a link 136B. The other end of the lever carries a roller 133 which is disposed in the path of travel of the bottom of the channel bar 87. The lever 132 is fulcrumed between its ends at 134 on a bracket 135 which sets on the plate member 76. The bar 127 is biased to its downward position by means of a tensioned spring 136 between the lever 132 and bearing 128 and an abutment stop 136A on the bar 127 is provided to limit its downward movement. By these means power from the motor is delivered to the pulley 113 to drive the rollers 109 and hence the spinner cores 51 when the channel bar 87 is in the lower position. The flow of power is disconnected so that the spinner cores are not rotated when the channel bar moves upward.

This motion of the spinner cores is synchronized with that of an abutment bar 137 on the front of the machine adjacent the bottom side of a group of waffle iron cover members 32 as they come into position adjacent the corresponding group of hollow molds 50 where the wafers thereon are to be transferred to the molds. The bar 137 is horizontally mounted at the top of a pair of spaced oscillating arms 138 and 139. These arms are secured to a horizontal shaft 140 which, in turn, is rotatably mounted in bearings 141 and 142. The said bearings are supported on the frame member 27. Also secured to the shaft 140 by a set screw 143 is the sleeve 144 at the upper end of an arm 145, the other end projecting downwardly and carrying a cam follower 146 which engages the guideway 147 of a cylindrical cam 148 secured to the shaft 48. Consequently, rotation of the axle 48 causes the lower end of the arm 145 to oscillate in accordance with the track of the cam and thereby position bar 137 between the opposed ends of rails 35 (Fig. 6). This motion is such as to cause the group of cover grill plates 32 to move forward against the scraper blades 69 of the molds 50 so that the scraper blades come in close proximity to the face of the cover grills, without actually touching them, at points in front of the baked wafers thereon so that the wafers 49, as they advance in the direction of the scraper blades, are guided thereby into the molds where they are picked up by the rotating cores 51 and rolled into cones. The rear camway rail 35 is open along this portion of the machine and the front rail 36 is bent forwardly to prevent interference with the action of the abutment bar 137.

After the cones are formed in the molds, the spinner cores 51 are moved upward by the reciprocating channel 87 and engage flexible stripping fingers 149 attached to the lower arms 74 carrying with them the formed cones. The fingers slide over the spinner cores which are for this purpose tapered at the top as shown in Fig. 5 and which, during the upward travel, stop rotating, due to transferring of the belt 120 to the idler pulley 117, and engage the upper edge of the cone, thereby stripping the cone from the core.

Some means must be provided to carry the stripped cones away from the machine; otherwise they would drop down into the molds again. The means illustrated comprises a discharge chute 150 having a bottom support 151 and side walls 152 and 153. The lower end of the chute is attached to a bracket 154 on the side frame of an inclined belt conveyor 155 and is positioned so that the cones fall on the belt of the conveyor and are carried thereby to a loading station. At the upper end of the chute, the side walls 152 and 153 are supported by bars 156 attached to and projecting upwardly from the brackets 64. The side walls straddle the path of travel of the spinner core and the bottom 151 of the chute is cut out, so as to clear the area around the path of the spinner core. In order to intercept the cones as they fall from the spinner core, a deflector 157, in the form of an inclined plane or wedge, is provided. The deflector is of a size which fits between the side walls 152 and 153 at the top of the chute. It is adapted to be moved into this position directly beneath the spinner core as the latter moves upwardly for the stripping operation. The stripped cones fall on the deflector and slide downwardly thereon into the chute. The deflector from this protracted position is retracted to permit the spinner core to again descend into the mold. This reciprocating motion of the deflector is effected by a cam action. The deflectors are each mounted on the end of a horizontal rod 158. The rod is slidably carried on brackets 159 and 160 attached to the carriage 52. A plurality of such deflectors, rods and brackets are provided to accommodate each of the cone forming units of the machine (4 illustrated) and the forward ends of all the rods are connected together by cross bars 161 for simultaneous movement. One of the rods 158 is provided with a bracket 162 which is connected to a vertical lever 163 by a link 164. The lever is fulcrumed at 165 to a bracket 166 attached to a suitable frame member, as shown. The lower end of the lever 163, below the fulcrum, carries a cam follower 167 which engages the groove 168 of another cylindrical cam 169 on the shaft 48. Accordingly, as the shaft 48 rotates, it oscillates the lever 163 and reciprocates the assembly of rods 158 and their attached deflectors 157. The throw of the cam 169 and the relative lengths of the arms of the lever 163 are proportioned so as to give the necessary amount of reciprocation for the deflectors and at the proper time.

The overall operation of the machine is as follows:

Batter from a reservoir (not shown) is intermittently fed through the hose 38 by a pump 37, to the nozzles 39 where it is discharged onto the bottom grill members 31 just before they pass into the oven 23. The cover members 32 close on the bottom grill members under the guiding influence of the cam rails 35 and 36 against the rollers 34, whereupon the closed grills pass through the oven and emerge at the bottom, as shown by the directional arrows. As the grills pass around the star wheels 22, the cover members are gradually opened by the cam rails, the cover members carrying with them the hot baked wafers 49. This is made possible by the use of intaglio or recessed lines on the surface of the base and cover grill, the lines of the cover grill being greater in number and/or of a greater depth to effect a more positive adhesive action than that of the base grill.

At the top of the star wheels the cover members are substantially in their full open position where they leave the guide rails and are engaged by the abutment bar 137 over which they slide. The length of the abutment bar 137 is coextensive with the unloading position of the grills and when a group of loaded grills are in this position, the abutment bar is moved forward by the action of the cam 148, thereby moving the cover grill close to the blades 69 of the hollow molds 50. This action is timed through the design of the cam so that the scraper blades initially come in close proximity to the face of the cover grills at a point just ahead of the baked wafer. Consequently, as the grills continue to move toward the oven, the wafers engage the scraper blades and are guided thereby into the molds. At this point in the cycle of operations, the spinner cores are in the molds and are being rotated, because in this downward position, the channel bar 87 is pressing downward on the roller 133 of the lever 132, causing the bar 127 to move upwardly and shift the belt 120 to the top pulley 116 which is connected for rotation with the pulley 113 through the shaft 114, thereby delivering power from the motor 123 to the rollers 109 which are slidably keyed to the spinner shafts 72.

By these means, an entire group of cones are formed simultaneously in the molds 50. After they are formed, the channel bar 87 is moved upwardly through the action of the cam 101 and cam follower 100 acting through the linkage system of the members 98 and 95. As the channel bar 87 moves upwardly, it releases pressure on the lever 132, permitting the spring 136 to pull the shift bar 127 downwardly and transfer the belt 120 from the roller 116 to the roller 117, thereby disconnecting power from the motor to the rollers 109. Consequently, the spinner cores stop rotating and, due to the lost motion connection between the fingers 86 and channel bar 87, remain in the molds a short period without rotating before continued upward movement of the channel elevates them out of the molds. The purpose of this period of rest is to insure setting of the seam of the formed cone. As the cones continue to travel upward, they are engaged by the stripping fingers 149 which eventually abut the top end of the formed cones and cause them to be released from the spinner cores. In the meantime, during the elevation of the spinner cores, the deflectors 157 are moved into operative position between the side walls 152 and 153 at the upper end of the chute through the action of the cam 169 operating through the lever 163, link 164 and bracket 162. As a result, by the time the cones are stripped from their spinner cores, the deflectors are in their protracted positions beneath the cones, to catch them as they fall and guide them downwardly into the chutes from whence they are delivered to the belt conveyor for transfer to a loading or packaging station.

In the return part of the cycle, and acting through the same cam arrangements, the deflectors are retracted to their inoperative positions, out of the reciprocating path of the spinner cores, and the latter are lowered into the mold for the beginning of the next cycle. In descending, the channel bar again bears against the lever 132 and elevates the shift bar 127 against the action of the spring 136 to shift the belt 120 to the upper pulley 116 and the abutment bar is moved back to receive the next group of cover grills. The latter is necessary so as to provide clearance between the scraper blades and the cover grill for the passage of the baked wafers until such time as the full complement of grills are in position for unloading. The cycle is then repeated as described.

A shielding plate 170 supported in any suitable manner, such as on a bracket 171 attached to the carriage 52, catches wafer crumbs which may fall from the upper part of the machine and thus prevent them from falling onto the grills where they might interfere with the proper formation of subsequent wafers. The shielding plate may be of a heat insulating material, such as laminated sheet metal and asbestos, to minimize heat from the lower grills reaching the rolling units.

Having thus described my invention, I claim:

1. An automatic cone making machine comprising a movable chain of waffle irons for baking wafers to be rolled into cones, said waffle irons comprising each a base member and a hinged cover member, a stationary unit adjacent said chain for rolling said wafers into cones, said unit comprising a stationary hollow inverted cone mold and a cooperating spinner core, said mold having a slotted inlet for the wafers and a scraper member adjacent said inlet, means for intermittently inserting said spinner core in and removing it from said mold, means for rotating said core during its insertion in said mold, means for arresting the rotation of said core and stripping cones therefrom upon removal thereof from the mold, a chute for receiving said stripped cones, a deflector in the path of movement of said spinner core for deflecting stripped cones into said chute, said deflector being removable from said path, and means for intermittently moving said deflector into and out of the path of movement of said core.

2. A machine for simultaneously rolling a plurality of cones comprising a stationary frame, a row of stationary cone molds carried by the frame, wafer rolling means associated with the molds, said molds having feed slots through their walls, wafer guide members attached to and projecting outwardly from said molds adjacent the slots, a conveyor, waffle irons including baking plates for baking and carrying wafers conveyed thereon along a path parallel to said row of cone molds, said guide members and plates being arranged relative to each other so that a plurality of the guide members simultaneously contact wafers carried by a corresponding plurality of baking plates and guide them into said cone molds through said feed slots.

3. An automatic cone rolling machine as defined by claim 2 having means for adjusting the position of the stationary molds relative to the waffle irons.

4. An automatic cone making machine comprising a chain of waffle irons for baking wafers to be rolled into cones, said waffle irons comprising each a base member and a hinged cover member, a stationary unit adjacent said chain for simultaneously rolling a plurality of said wafers into cones, said unit comprising a plurality of stationary hollow inverted cone molds spaced apart parallel to the line of travel of said chain, a cooperating spinner core for each of said molds having each a slotted inlet and a scraper member adjacent said inlet, means for simultaneously reciprocating said spinner cores into and out of said molds, respectively, means for simultaneously rotating all of said cores, means for arresting the rotation of said cores and stripping cones therefrom upon removal thereof from the molds, and retractable means for receiving said stripped cones.

5. A machine as defined by claim 2 and means for maintaining the guide members out of contact with the plates.

6. A cone rolling mechanism for a cone rolling machine having a movable chain of waffle irons for baking wafers to be rolled into cones, said mechanism comprising a stationary frame, a plurality of stationary hollow inverted cone molds carried by said frame, said molds being arranged in a row parallel to the path of movement of said waffle irons, said molds having feed slots through their walls, wafer guide members attached to and projecting outwardly from said molds adjacent the slots to contact wafers carried by the waffle irons and guide them into said molds through said feed slots, spinner cores associated with said molds for forming into cone shape the wafers fed into said molds, means for removing said spinner cores from said molds after formation of the cones therein, means for stripping the formed cones from the cores, chutes connected to the molds for receiving the stripped cones, and means above the molds for deflecting the stripped cones to said chutes.

7. The mechanism as defined by claim 6 in which the means for deflecting the stripped cones comprises movable deflectors and means for moving the deflectors to and from a position directly above the molds and beneath the stripped cones.

8. The mechanism as defined by claim 6 in which the means for deflecting the stripped cones comprises deflectors mounted for reciprocation across the top of the molds, and means for reciprocating each deflector to and from a position directly above its corresponding mold.

References Cited in the file of this patent

UNITED STATES PATENTS

| | | |
|---|---|---|
| 1,247,090 | Dieterich | Nov. 20, 1917 |
| 1,271,844 | Bruckman | July 9, 1918 |
| 1,376,711 | Levy | May 3, 1921 |
| 2,628,576 | Finke | Feb. 17, 1953 |